US008001336B2

(12) United States Patent
Markova et al.

(10) Patent No.: US 8,001,336 B2
(45) Date of Patent: Aug. 16, 2011

(54) DETERMINISTIC MEMORY MANAGEMENT IN A COMPUTING ENVIRONMENT

(75) Inventors: Gergana Vassileva Markova, Vail, AZ (US); Harry Clayton Husfelt, Jr., Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 685 days.

(21) Appl. No.: 11/681,650

(22) Filed: Mar. 2, 2007

(65) Prior Publication Data

US 2008/0215826 A1  Sep. 4, 2008

(51) Int. Cl.
*G06F 12/00* (2006.01)

(52) U.S. Cl. ......... 711/154; 711/E12.009; 711/E12.012; 707/813

(58) Field of Classification Search ................... 711/154; 707/206
See application file for complete search history.

(56) References Cited

U.S. PATENT DOCUMENTS

| | | | |
|---|---|---|---|
| 5,778,350 A * | 7/1998 | Adams et al. ..................... | 707/1 |
| 6,892,202 B2 | 5/2005 | Arcand | |
| 7,072,934 B2 | 7/2006 | Helgeson et al. | |
| 2002/0065875 A1* | 5/2002 | Bracewell et al. ............ | 709/203 |
| 2004/0103413 A1 | 5/2004 | Mandava et al. | |
| 2005/0220039 A1* | 10/2005 | Hoshino et al. ............... | 370/261 |
| 2005/0267770 A1* | 12/2005 | Banavar et al. ................... | 705/1 |
| 2006/0070031 A1* | 3/2006 | Szyperski et al. ............ | 717/120 |

FOREIGN PATENT DOCUMENTS

JP  2001176250 A  6/2001

* cited by examiner

*Primary Examiner* — Michael C Krofcheck
(74) *Attorney, Agent, or Firm* — Century IP Group, Inc.; F. Jason Far-hadian, Esq.

(57) ABSTRACT

Systems and methods for memory management in a computing environment are provided. The method comprises uniquely identifying a first object associated with a first task for an application executed in a computing environment, wherein a first area of memory is allocated to the first object; determining a first execution scope for the first task according to a first execution context associated with the first task, wherein the first context defines a first life expectancy for the first task within the execution environment hierarchy; determining a change in execution scope of the first task, in response to monitoring the first execution context; and deallocating the first area of memory, in response to determining that the first task is no longer executed within the first execution scope.

20 Claims, 5 Drawing Sheets

DETERMINISTIC MEMORY MANAGEMENT IN A COMPUTING ENVIRONMENT

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention exclusively to material associated with such marks.

FIELD OF INVENTION

The present invention relates generally to memory management in a computing environment and, more particularly, to a system and method for deterministically allocating and deallocating memory space to a task executed in the computing environment based on the task's execution scope.

BACKGROUND

Memory management in a computing environment involves reserving portions of the computer memory for the purpose of loading executable logic code (i.e., software programs) and later freeing the memory for reuse according to a certain memory management scheme. The process of reserving memory is typically referred to as "allocating" memory space to a logical object; and the process of freeing memory is typically referred to as "deallocating" the memory space.

The deallocating scheme, depending on the type of programming language used, sometimes includes a "garbage collection" process. The term "garbage" in this context refers to a memory space allocated to a logical object that no longer is needed for the proper execution of the program. Generally, when the so-called garbage object is collected, it means that the corresponding memory space is deallocated.

Manual and automatic memory management schemes have been implemented. In the manual scheme, a programmer will have to actively insert instructions in the logic code in order to identify and deallocate the memory space associated with unused objects. The automatic scheme is only used at the programming language level and causes a garbage collection cycle to start only when the system is detected to be low on memory.

Unfortunately, the above two schemes do not provide optimum results in memory intensive software applications, such as Internet-based applications (i.e., web applications) that support multitudes of sessions established between a web server and one or more client machines. Memory management becomes particularly burdensome and complex when a plurality of servlets are utilized to service a plurality of requests submitted from one or more clients to a web server during a web session, for example.

Typically, when memory is allocated to a logical object in a session, the memory remains allocated until the session is terminated, regardless of whether the task that corresponds to the logical object is in an active or inactive state during the entire length of the session. A complex web application may support and require the execution of many logical tasks and servlets during each session. If the garbage collection process is delayed until the end of each session or until the system is running low in memory, the web server's performance will be adversely affected because the web server may quickly run out of memory and not be able to recover.

Thus, memory management methods and systems are needed that can overcome the aforementioned shortcomings.

SUMMARY

The present disclosure is directed to a system and corresponding methods that facilitate memory management in a computing environment by defining one or more execution scopes for active tasks in a computing environment.

For the purpose of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method for memory management in a computing environment comprises uniquely identifying a first object associated with a first task for an application executed in a computing environment, wherein a first area of memory is allocated to the first object; determining a first execution scope for the first task according to a first execution context associated with the first task, wherein the first context defines a first life expectancy for the first task within the execution environment hierarchy; determining a change in execution scope of the first task, in response to monitoring the first execution context; and deallocating the first area of memory, in response to determining that the first task is no longer executed within the first execution scope.

In one embodiment, the method further comprises uniquely identifying a second object associated with a second task which is a subtask of the first task, wherein a second area of memory is allocated to the second object; determining a second execution scope for the second task according to a second execution context associated with the second task, wherein the second context defines a second life expectancy for the second task within the execution environment hierarchy relative to the first task; determining a change in execution scope of the second task, in response to monitoring the second execution context; and deallocating the second area of memory, in response to determining that the second task is no longer executed within the second execution scope.

A third object associated with a third task that is a subtask of the second task may be further uniquely identified, wherein a third area of memory is allocated to the third object; and the third area of memory is dallocated, in response to determining that the third task no longer actively services a request. The second execution context may be also terminated, in response to determining that the third task no longer actively services a request. Further, the first execution context may be terminated, in response to determining that the second task no longer actively services a request.

That is, the second execution context may be terminated, in response to determining that no subtask of the second task actively services a request; and the first execution context may also be terminated, in response to determining that no subtask of the first task actively services a request.

In one embodiment, the first, second and third tasks are executed within a communication session established between a server system and a client system over a communication network. The communication network in some embodiments comprises the Internet. The first, second and third areas of memory may be deallocated, in response to determining that the communication session has terminated.

In accordance with another embodiment, a system for memory management in a computing environment is provided. The system may comprise a logic unit for uniquely identifying a first object associated with a first task for an application executed in a computing environment, wherein a first area of memory is allocated to the first object; a logic unit for determining a first execution scope for the first task according to a first execution context associated with the first task, wherein the first context defines a first life expectancy for the first task within the execution environment hierarchy; a logic unit for determining a change in execution scope of the first task, in response to monitoring the first execution context; and a logic unit for deallocating the first area of memory, in response to determining that the first task is no longer executed within the first execution scope.

The system may further comprise a logic unit for uniquely identifying a second object associated with a second task which is a subtask of the first task, wherein a second area of memory is allocated to the second object; a logic unit for determining a second execution scope for the second task according to a second execution context associated with the second task, wherein the second context defines a second life expectancy for the second task relative to the first task; a logic unit for determining a change in execution scope of the second task, in response to monitoring the second execution context; and a logic unit for deallocating the second area of memory, in response to determining that the second task is no longer executed within the second execution scope.

In one embodiment the system further comprises a logic unit for uniquely identifying a third object associated with a third task that is a subtask of the second task, wherein a third area of memory is allocated to the third object; and a logic unit for deallocating the third area of memory, in response to determining that the third task no longer actively services a request.

In another embodiment, a computer program product comprising a computer useable medium having a computer readable program is provided. The computer readable program when executed on a computer causes the computer to perform the procedures and functions disclosed in association with the above systems and methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXEMPLARY EMBODIMENTS

The present disclosure is directed to systems and corresponding methods that facilitate memory management in application environments wherein multiple logical tasks and subtasks are executed. A memory management method is implemented to define and monitor various execution scopes (e.g., session scope, task/subtask scope and current scope) for one or more tasks and subtasks, such that objects associated with said tasks and subtasks are removed from memory according to said defined execution scopes.

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

For example, in the following certain aspects of the invention are disclosed as applicable to servlets that are executed in a web-based environment. It is noteworthy, however, that such application is by way of example. As such, the scope of the invention should not be construed as limited to such exemplary embodiments. In alternative embodiments, the disclosed systems and methods may be applicable to manage memory in any computing environment.

Figure 1:
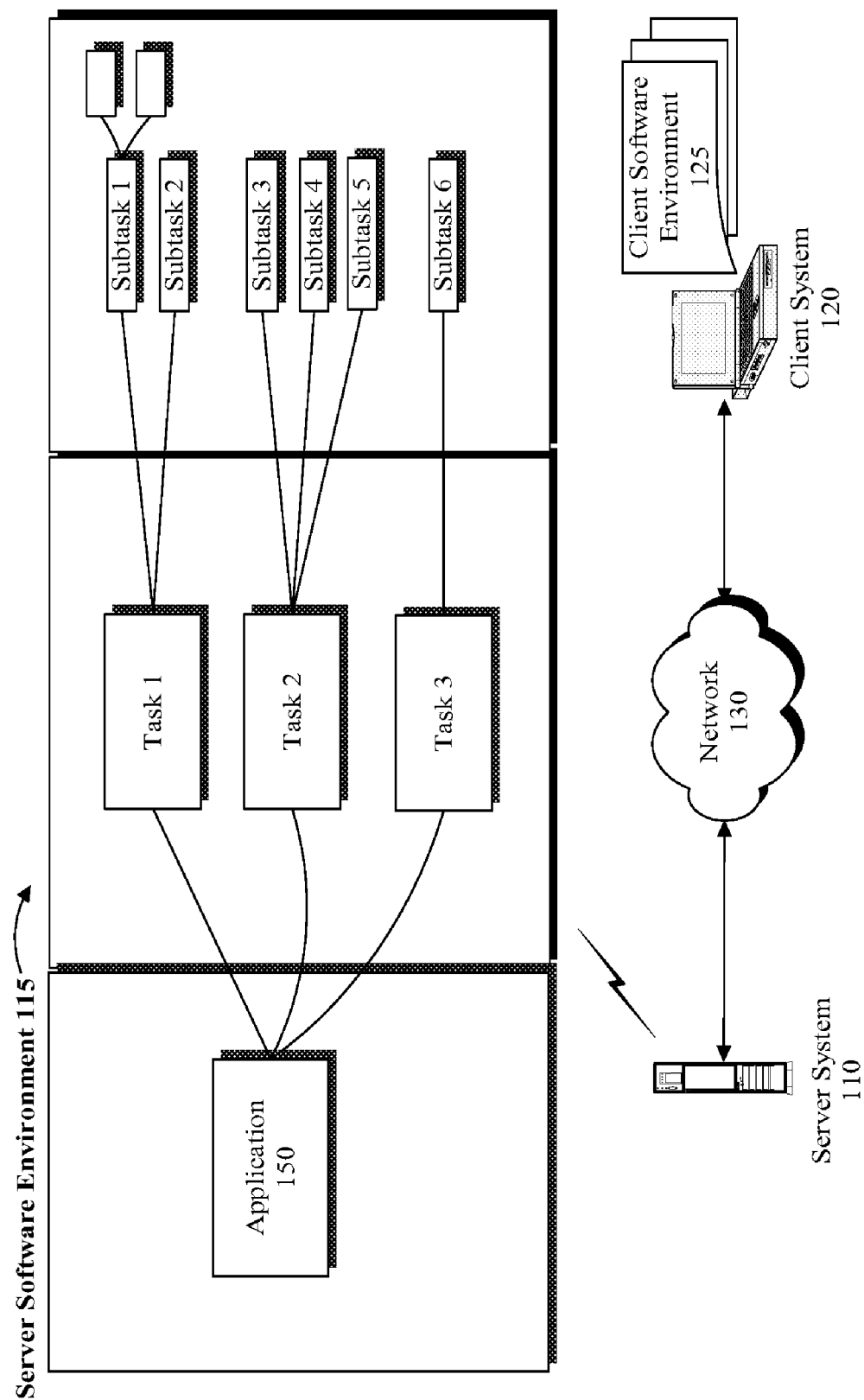
FIG. 1 illustrates an exemplary software environment for a web server, in accordance with one or more embodiments, wherein the server system is in communication with a client system over a communication network.

Referring to FIG. 1, an exemplary computing environment is illustrated wherein a server system (hereafter "server") 110 is in communication with a client system (hereafter "client") 120 over a communication network ("network") 130. In this exemplary embodiment, network 130 is implemented over the Internet (i.e., the World Wide Web (WWW)) in which multitudes of computing systems including server 110 and client 120 are interconnected to communicate with one another. Depending on implementation, however, network 130 may be constructed according to a local, remote or distributed framework in alternate embodiments.

Preferably, server 110 is a web server and client 120 is a computing machine having client software environment 125 for submitting requests to server 110 over network 130. As shown, server 110 comprises a server software environment 115 which is configured for replying to requests submitted by client 120. The exchange of requests and replies over network 130 takes place within the context of one or more sessions established between server 110 and client 120 to service client's 120 requests.

A submitted request may be serviced by an application 150 executing in server software environment 115. Application 150 may be a logic code (e.g., Java applet, Java servlet, or other functional equivalent module) that persists in a web-based environment, for example. That is, once application 150 is invoked in response to a first request received in a session, application 150 preferably stays active in memory to fulfill one or more subsequent requests submitted for the remainder of the session.

The persistence of application 150 in memory allows it to expediently respond to client's 120 requests. Thus, advantageously, in contrast to other applications (e.g., common gateway interface (CGI) programs) that are removed from the server's 110 execution environment after a request is fulfilled, application 150 preferably persists in memory to avoid the time delay associated with the setting up and the tearing down procedures that are otherwise needed each time a request is serviced.

Figure 2:
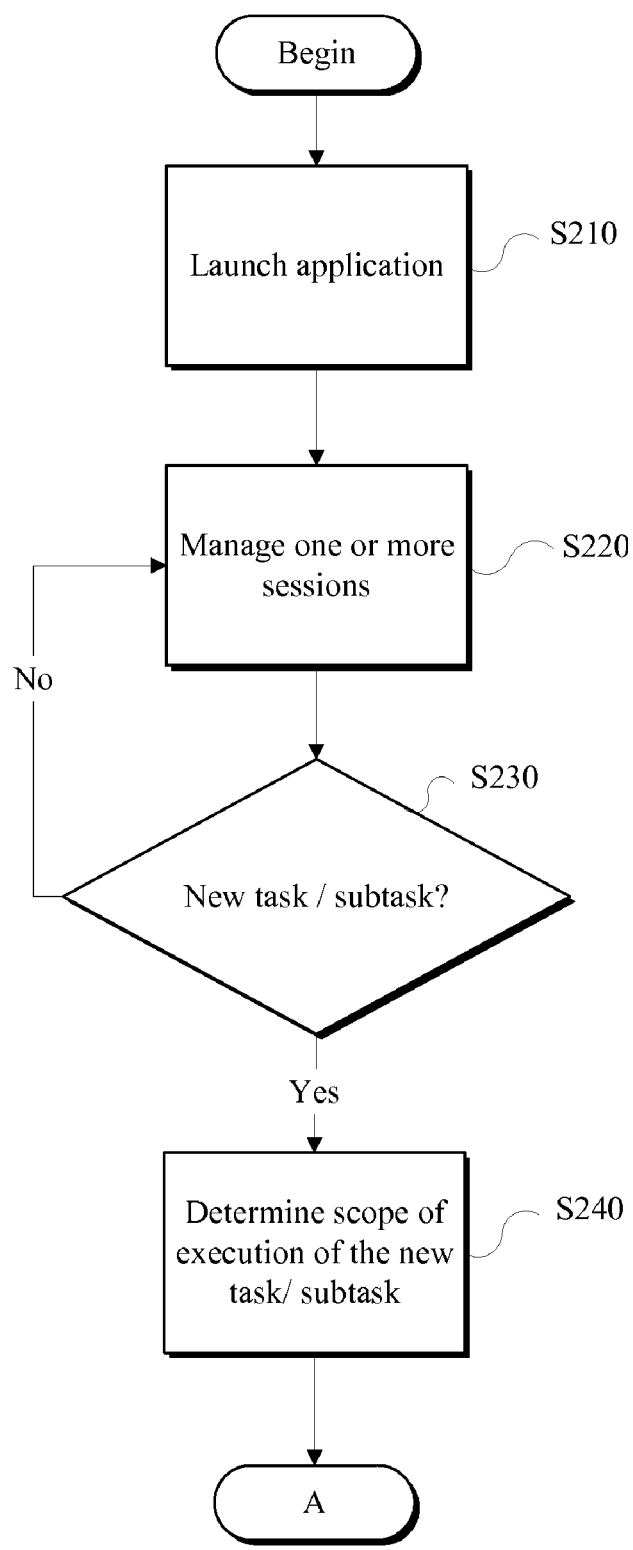
FIG. 2 is a flow diagram of an exemplary method for determining the scope of execution of one or more tasks in a communication session established between the client and server systems of FIG. 1, in accordance with one embodiment.

Referring to FIGS. 1 and 2, in one embodiment, application 150 is launched by server 110, for example, in response to one or more requests submitted by client 120 (S210). Depending on the number of clients or the number of submitted requests, application 150 may manage one or more sessions (S220). In each session, application 150 may be executed to open one or more tasks and subtasks (e.g., tasks 1 through 3 and subtasks 1 through 6, etc.) as shown in FIG. 1.

The tasks and subtasks are, for example, associated with one or more operations performed or managed by a servlet, java server pages (JSP) or other programming application (e.g., application programming interface (API)) that is configured to service client requests. As shown, in accordance with one embodiment, a task (e.g., task 2) may have one or more subtasks (e.g., subtasks 3, 4, 5) which may be opened in the same session. Each subtask may also have one or more other subtasks.

Each task or subtask once opened is associated with at least one logical object to which a memory space is allocated. Each object is executed to perform the related operations for the task or subtask. Depending on implementation, in each session, various schemes may be used to manage each task/subtask and the allocated memory space associated therewith. For example, a logical module (e.g., a session manager API) may be used to add or remove session objects associated with each task/subtask.

In one embodiment, the session manager determines whether a new task/subtask is opened by application 150 in order to service a request, for example (S230). When a new task/subtask is opened, the session manager monitors or edits a data structure (e.g., a descriptor file) to track the task and the associated subtasks within the execution hierarchy. Preferably, the session manager assigns a unique identifier to each task opened by application 150 according to the task's scope of execution. This unique identifier can be used to define a task type and to further categorize each task/subtask, as provided in further detail below.

In one embodiment, the descriptor file comprises programming language syntax, such as the extensible markup language (XML) to define a description for each task type. For example, the elements of the descriptor file may define the components of each task. For each defined task type, a default specific component may be identified in the task type definition as a task initial default component. Accordingly, a developer may define a set of tasks that a user can perform, so that for each task type one or more specific components (e.g., alternative JSP pages) are defined.

In accordance with one embodiment, when a new task/subtask is opened, a logical module (e.g., a scope manager API) is used to determine the scope of execution of the new task/subtask (S240). In one embodiment, the scope manager is used to monitor objects associated with each task/subtask that are shared in a session. Accordingly, the scope manager manages the creation (i.e., allocation) and removal (i.e., deallocation) of session objects and supports the capability to request objects to be added to or removed from the session.

Figure 3:
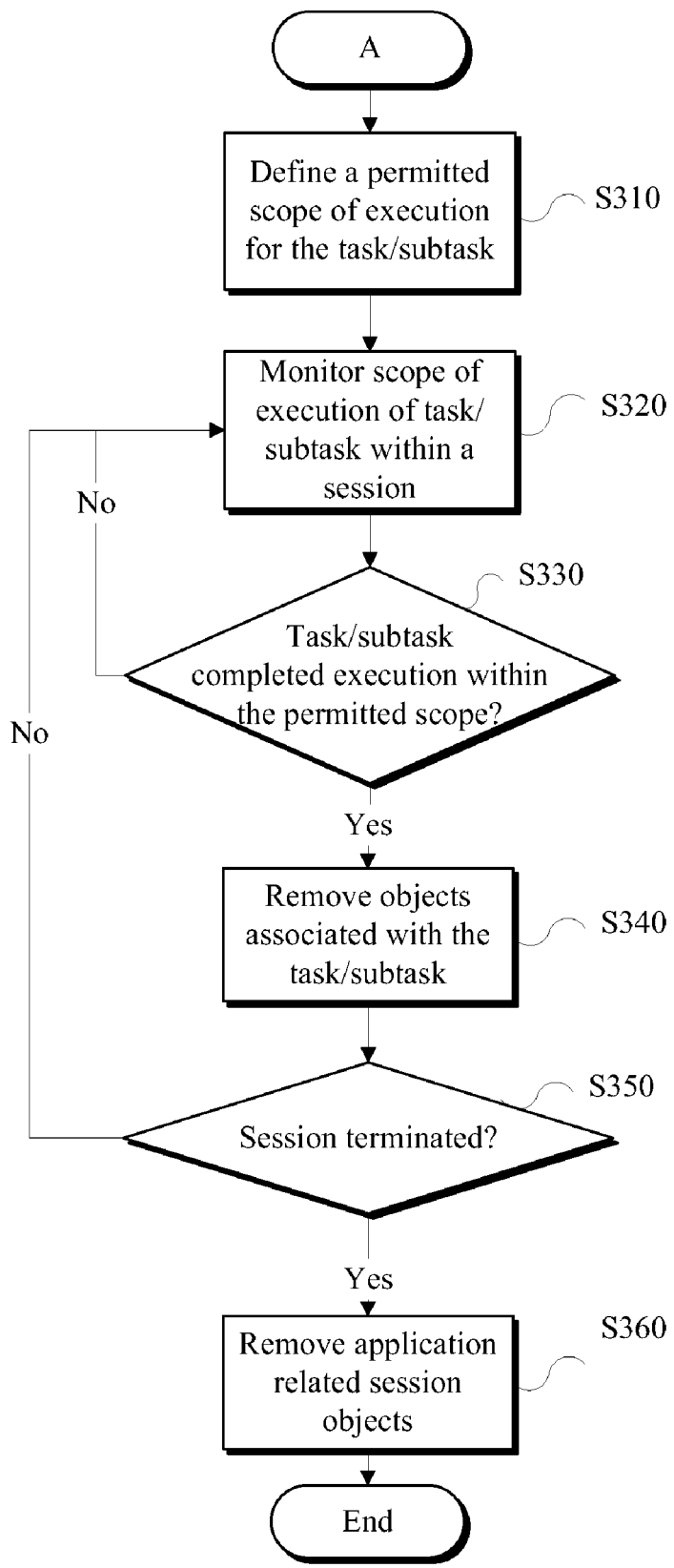
FIG. 3 is a flow diagram of an exemplary method for managing the memory allocated to one or more objects with defined execution scopes, in accordance with one embodiment.

Referring to FIG. 3, the scope manager is implemented, in accordance with one embodiment, to also define a permitted scope of execution for an open task/subtask in a session (S310). That is, scope manager is implemented to specify the lifetime granularity of one or more objects corresponding to each task in relation to the current application flow, and to update the objects' permitted scope of execution. Defining a permitted scope of execution (i.e., defining the multiple layers of lifetime granularity for a task/subtask in a session) provides for the possibility to free up the memory spaces allocated to one or more objects that correspond to that task/subtask at various execution contexts or levels, preferably before the server's 110 memory space reaches a critically low threshold, and preferably before the session within which the objects persist terminates.

In one embodiment, the permitted scope of execution for a task/subtask and the objects that correspond to said task/subtask is defined by the scope manager, for example, preferably at the time the task/subtask is added to a session. The scope of execution may be defined according to the following three scopes or contexts: (1) application context, (2) task/subtask context and (3) current context. It is noteworthy, however, that depending on implementation, other contexts or criteria may be designated or assigned. For the purpose of example and brevity, in the following we have limited the discussion to the above-noted three execution contexts.

In the application context, an object associated with application 150 is kept active for the duration of the session. That is, the corresponding objects that control the operation of application 150 are not removed from the execution environment until the session is terminated. The application context may be used to define a scope of execution for state information shared and potentially updated among different tasks/subtasks. For example, a server state structure outlining defined nodes and schedules on the server can be updated from multiple tasks, computers, applications, node groups and schedules and is preferably persistent for the lifetime of the session.

In the task/subtask context, an object associated with an open task/subtask is kept for the duration of the execution of the task/subtask (i.e., while the task/subtask is active to respond to a submitted request). For example, in the node group task of an IBM Tivoli Storage Manager (ITSM), relevant information about the node groups defined to the ITSM server and the current state and information data for task components (e.g., wizards, notebook and forms launched in the node groups task) are kept until the termination of the corresponding tasks.

In the current context, an object associated with an active task/subtask is kept for the duration of a component of the task/subtask being active at that time. For example, in the node group task of ITSM, the file spaces table data may be relevant for a specific computer or application notebook, where a computer or application is chosen before that notebook is displayed to a user. In such a scenario, the current context is associated, for example, with a unique JSP page.

As such, the scope manager monitors the scope of execution for each task/subtask within a session, according to a predefined execution context (S320). When the task/subtask has completed execution within the permitted scope (S330), the scope manager removes the objects associated with the task/subtask from the execution environment (S340). And, when the session is terminated (S350), the session manager, preferably, removes some or all application related session objects (S360).

In the following, an exemplary scope manager interface implemented according to a Java object class is provided. It is noteworthy that the scope of the invention should not be construed as limited to this exemplary embodiment, as other implementations and adaptations of the disclosed principals in different programming languages are possible.

```
public class DsmScopeManager
{
    public static final byte COMP_SCOPE;
    public static final byte TASK_SCOPE;
    public static final byte CCT_SCOPE;
    public static final void add (byte scope, String scopeID, Object value,
        HttpSession session);
    public static final void add (byte scope, final Object[ ][ ] attrs,
        HttpSession session);
    public static final void addPersistent (String scopeID, Object value, byte
        scope, HttpSession session);
    public static final void makePersistent (String scopeID, byte
        scope, HttpSession session);
    public static final HashSet getScopeAttrSet (byte scope,
        HttpSession session);
    public static final void cleanUp (byte scope, HttpSession session);
    public static final void cleanUpTask (WccContext, wccContext,
        HttpSession session);
    ...
}
```

In accordance with one embodiment, the following exemplary framework supports the functionality for the above-described scope manager. The framework is a software application that manages the runtime flow of application 150 and is preferably implemented in a web container, in accordance with one embodiment, to detect application, task and task specific components. The framework may further detect the user flow state and object execution scope and help determine the appropriate memory management and object clean up schemes.

In one embodiment, the framework comprises a set of related classes used for detecting application flow and for monitoring the active tasks and their associated components. Using this framework, tasks that are currently active, the tasks that are currently displayed to a user, the current active components for each task, and the flow in which those components were viewed by the user can be monitored and determined.

A certain class (e.g., DsmTasksFactory class) may be implemented to identify the relevant tasks and the associated components. In one embodiment, such a class is implemented as a singleton class, for example. A singleton class is a class for which a single instance is created.

Preferably, said class can provide information to support a given DSM task type and take as input an XML application descriptor file, for example, that describes each DSM task type. The elements of the XML file may provide predefined items of information required to launch a task and possibly the nested components (e.g., task JSP pages and alternative JSP pages) to which task specific components are mapped.

In one embodiment, a method interface supports access to the task scope attributes setup. A controller (e.g., DsmTaskController) class may be responsible for handling task related events and supporting the creation and management of logical tasks and the content of each task in application 150. This controller delegates to an application module (e.g., a task event listener) the responsibility of managing specific task events, such as activating, deactivating or closing one or more tasks.

Accordingly, the framework monitors and controls the setup, status, execution hierarchy and scope of one or more tasks and the related events in a session. Thus, the framework, in one embodiment, is responsible for creating the task frames that include the task view (e.g., JSP) and preferably identifying other task specific characteristics, such as task help. A handling module generates a response to be sent to the user's browser to display a given task section of the application user interface, or to update that section if the task already exists.

At time of completion of a task/subtask, the associated scope attributes are cleaned up and removed from the session execution environment. The framework created object structures keeping track of the scope context are also preferably disregarded. In one embodiment, a class (e.g., DsmConsoleContext) is defined that comprises information about the state of application 150 from the point of view of the supporting framework. Said class accumulates all session scope names to persist for the lifetime of the current application session.

In one embodiment, a servlet or portlet package provides interfaces and classes (e.g., HttpSessionBindingListener interface and HttpSessionBindingEvent class) to help manage resources within a session. For example, an object (e.g., DsmConsoleContext object) may be associated (e.g., bonded) with a session (e.g., HttpSession). Through this association, the framework detects the termination of a session, so that the corresponding objects can be removed from the execution environment.

In an exemplary embodiment, a defined context class (e.g., DsmConsoleContext) has a reference to the session (e.g., HttpSession) and vice versa. When the defined context class is disassociated (e.g., unbound) from the session, the double reference between the session and the context is dropped. This double reference permits the framework to access the session provided that either the session or the context is available.

Another context class (e.g., WccContext class) may be implemented to monitor the current state of task navigation and attribute scope. This class monitors the currently viewed or active tasks within various execution scopes and tracks the corresponding object instances (e.g., DsmTask instances) created or removed on-demand, for example, in response to received requests.

In accordance with one embodiment, when application 150 is launched, a default task is created and is assumed to represent a currently viewed task. An object class (e.g., DsmTask class) defines the attributes memory management information for a task and preferably maintains information related to a unique identifier for the task and a set of persistent attributes to be kept in the session scope for the lifetime of the task. As additional information is accumulated for a task during the various scopes of execution, said object class (e.g., DsmTask class) monitors the display flow of the task's components. As such, the current task components are monitored by this class.

In some embodiments, when a task is initially opened, a primary component of the task is assumed to represent the current context, as defined in the descriptor file for the corresponding task type. The framework preferably provides the definition of a primary view page and zero or more alternate views (e.g., JSP pages) that a given task type can display based on an event. In an exemplary embodiment, the primary page is displayed by default.

Another context class (e.g., DsmContextSwitch class) may be used, in accordance with one or more embodiments, to switch the displayed current context, in response to a predefined event or to alter the contents of the application console. For example, the browser view may initially display a page that shows a table of media copies. An action supported by this table may allow a user to, for example, use a wizard to create a media group.

In an exemplary embodiment, the server 110 creates a media group form to replace the table page, in response to a create media group request to switch from a first context to a second context, for example. Any information passed between the two contexts can be placed in the session as attributes. Such attributes are, for example, needed to define initial setup or navigation guidance for the lifetime of a newly launched component. Such attributes may be accumulated in a self-contained object instance (e.g., DsmComponentContext class instance), for example. The lowest granularity level attributes are preferably removed from the session execution environment, when a switch back to the launching component is detected by the framework.

In different embodiments, the invention can be implemented either entirely in the form of hardware or entirely in the form of software, or a combination of both hardware and software elements. For example, client 120 and server 110 may comprise a controlled computing system environment that can be presented largely in terms of hardware components and software code executed to perform processes that achieve the results contemplated by the system of the present invention.

Figure 4A:
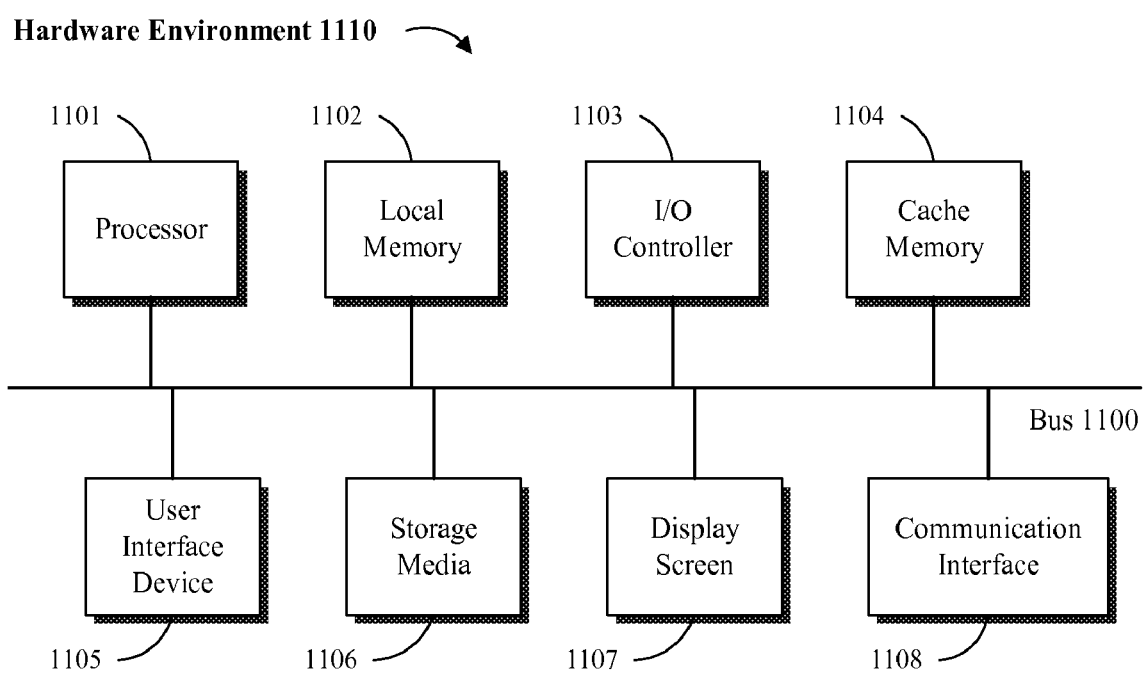
FIGS. 4A and 4B are block diagrams of hardware and software environments in which a system of the present invention may operate, in accordance with one or more embodiments.
Figure 4B:
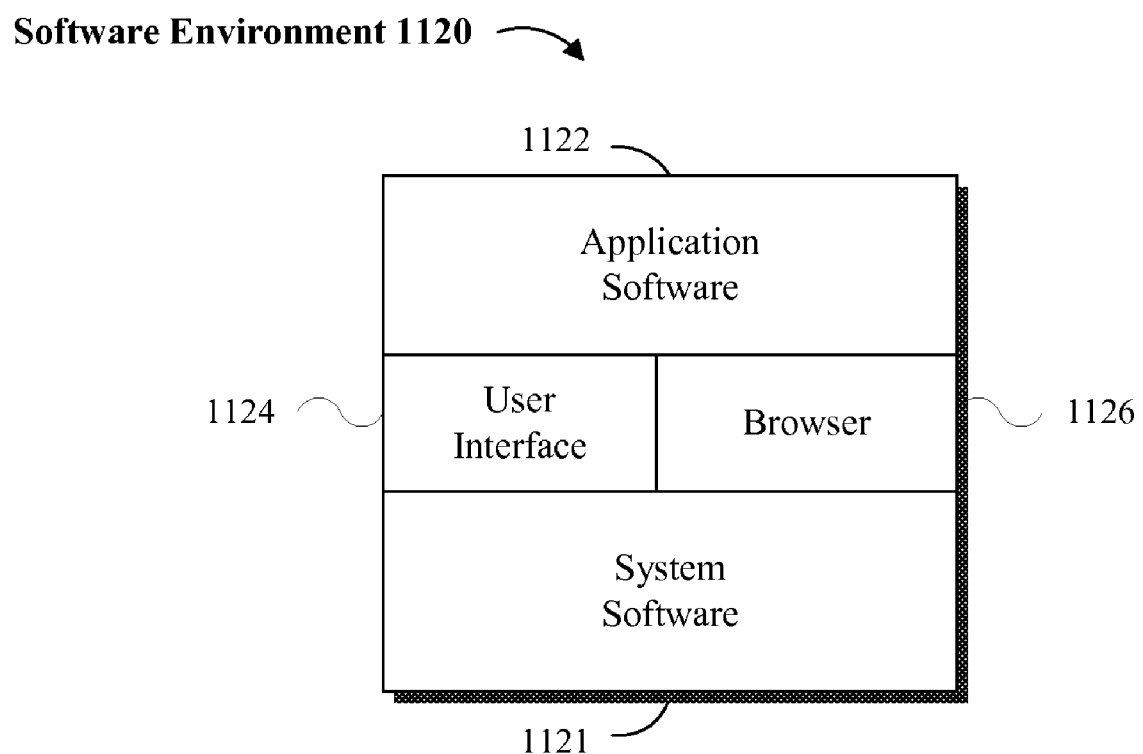

Referring to FIGS. 4A and 4B, a computing system environment in accordance with an exemplary embodiment is composed of a hardware environment 1110 and a software environment 1120. The hardware environment 1110 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 1120 is divided into two major classes comprising system software 1121 and application software 1122. System software 1121 comprises control programs, such as the operating system (OS) and information management systems that instruct the hardware how to function and process information.

In a preferred embodiment, application 150 is implemented as application software 1122 executed on one or more hardware environments to service one or more requests submitted by client 120. Application software 1122 may comprise but is not limited to program code, data structures, firmware, resident software, microcode or any other form of information or routine that may be read, analyzed or executed by a microcontroller.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device.

The computer-readable medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital video disk (DVD).

Referring to FIG. 4A, an embodiment of the application software 1122 can be implemented as computer software in the form of computer readable code executed on a data processing system such as hardware environment 1110 that comprises a processor 1101 coupled to one or more memory elements by way of a system bus 1100. The memory elements, for example, can comprise local memory 1102, storage media 1106, and cache memory 1104. Processor 1101 loads executable code from storage media 1106 to local memory 1102. Cache memory 1104 provides temporary storage to reduce the number of times code is loaded from storage media 1106 for execution.

A user interface device 1105 (e.g., keyboard, pointing device, etc.) and a display screen 1107 can be coupled to the computing system either directly or through an intervening I/O controller 1103, for example. A communication interface unit 1108, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 1110 may not include all the above components, or may comprise other components for additional functionality or utility. For example, hardware environment 1110 can be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In some embodiments of the system, communication interface 1108 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 4B, application software 1122 can comprise one or more computer programs that are executed on top of system software 1121 after being loaded from storage media 1106 into local memory 1102. In a client-server architecture, application software 1122 may comprise client software and server software. For example, in one embodiment of the invention, client software is executed on computing system 100 and server software is executed on a server system (not shown).

Software environment 1120 may also comprise browser software 1126 for accessing data available over local or remote computing networks. Further, software environment 1120 may comprise a user interface 1124 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective steps of each method are performed are purely exemplary. Depending on implementation, the steps can be performed in any order or in parallel, unless indicated otherwise in the present disclosure. Further, the logic code is not related, or limited to any particular programming language, and may comprise of one or more modules that execute on one or more processors in a distributed, non-distributed or multi-processing environment.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method for memory management in a computing environment, the method comprising:
   uniquely identifying a first object associated with a first task for an application executed on a server system, responsive to establishment of a session between a client system and the server system over a communication network, wherein the application services requests submitted by the client system to the server system, and wherein a first area of memory in the server system is allocated to the first object;
   determining a first execution scope for the first object according to a first execution context associated with the first object, wherein in the first context, a first life expectancy is determined for the first object within an execution environment hierarchy defined by an application execution context, a task execution context, and a current execution context,
   wherein in the application execution context, the first memory area remains allocated to the first object associated with controlling the application executed in the duration of the session, unless the server system's memory space approaches a predetermined threshold,
   wherein in the task execution context, the first memory area remains allocated to the first object associated with the first task, while the first task is executed within the context of the first application, unless the server system's memory space approaches a predetermined threshold, and
   wherein in the current execution context, the first memory area remains allocated to the first object associated with a component of the first task while said component remains active within the context of the first task, unless the server system's memory space approaches a predetermined threshold;
   determining a change in execution scope of the first object, in response to monitoring the first execution context, wherein the first execution context is based on a flow state of a user using the client system during the established session and the first life expectancy of the first object within the execution environmental hierarchy defined by the application execution context, the task execution context and the current execution context;
   determining an appropriate memory management and object clean up scheme based on the user flow state and the determined first life expectancy of the first object; and
   deallocating the first area of memory, based on the determined scheme, in response to determining that the server's memory space of has approached a predetermined threshold before the session within which the first object persists terminates.

2. The method of claim 1, further comprising:
   uniquely identifying a second object associated with a second task which is a subtask of the first task, wherein a second area of memory is allocated to the second object;
   determining a second execution scope for the second object according to a second execution context associated with the second object, wherein the second context defines a second life expectancy for the second object within an execution environment hierarchy relative to the first task;
   determining a change in execution scope of the second object, in response to actively monitoring the second execution context, wherein the second execution context is defined based on flow state of a user using the client system during the established session;
   determining an appropriate memory management and object clean up scheme based on the user flow state and object execution scope of the second object; and
   deallocating the second area of memory, based on the determined scheme, in response to determining that server's memory space has approached a predetermined threshold before the first task terminates.

3. The method of claim 2, further comprising:
   uniquely identifying a third object associated with a third task that is a subtask of the second task, wherein a third area of memory is allocated to the third object; and
   deallocating the third area of memory, in response to determining that server's memory space has approached a predetermined threshold before the second task terminates.

4. The method of claim 3, wherein the first, second and third tasks are executed within a session established between a server system and a client system over a communication network.

5. The method of claim 4, wherein the communication network comprises the Internet.

6. The method of claim 4 wherein the first, second and third areas of memory are deallocated, in response to determining that the session has terminated.

7. The method of claim 3, wherein the second execution context is terminated, in response to determining that the third task no longer actively services a request.

8. The method of claim 7, wherein the first execution context is terminated, in response to determining that the second task no longer actively services a request.

9. The method of claim 2, wherein the second execution context is terminated, in response to determining that no subtask of the second task actively services a request.

10. The method of claim 1, wherein the first task is executed within a session established between a server system and a client system wherein the first execution context is terminated, in response to determining that the session is terminated.

11. A computer implemented system for memory management in a computing environment, the system comprising:
    at least one processor for supporting memory management schemes associated with allocation and deallocation of memory space in a server system in communication with a client system;
    a logic unit for uniquely identifying a first object associated with a first task for an application executed on the server system, responsive to establishment of a session between the client system and the server system over a communication network, wherein the application services requests submitted by the client system to the server system, and wherein a first area of memory in the server system is allocated to the first object;

a logic unit for determining a first execution scope for the first object according to a first execution context associated with the first object, wherein in the first context a first life expectancy is determined for the first object within an execution environment hierarchy defined by an application execution context, a task execution context, and a current execution context, wherein in the application execution context, the first memory area remains allocated to the first object associated with controlling the application executed in the duration of the session, unless the server system's memory space approaches a predetermined threshold, wherein in the task execution context, the first memory area remains allocated to the first object associated with the first task while the first task is executed within the context of the first application, unless the server system's memory space approaches a predetermined threshold, and wherein in the current execution context, the first memory area remains allocated to the first object associated with a component of the first task while said component remains active within the context of the first task, unless the server system's memory space approaches a predetermined threshold;

a logic unit for determining a change in execution scope of the first object, in response to monitoring the first execution context, wherein the first execution context is defined based on a flow state of a user using the client system during the established session and the first life expectancy of the first object within the execution environmental hierarchy defined by the application execution context, the task execution context and the current execution context;

a logic unit for determining an appropriate memory management and object clean up scheme based on the user flow state and the determined first life expectancy of the first object; and a logic unit for deallocating the first area of memory, based on the determined scheme, in response to determining that the server's memory space has approached a predetermined threshold before the session within which the first object persists terminates.

12. The system of claim 11, further comprising:

a logic unit for uniquely identifying a second object associated with a second task which is a subtask of the first task, wherein a second area of memory is allocated to the second object;

a logic unit for determining a second execution scope for the second object according to a second execution context associated with the second object, wherein the second context defines a second life expectancy for the second object within an execution environment hierarchy relative to the first task;

a logic unit for determining a change in execution scope of the second object, in response to actively monitoring the second execution context, wherein the second execution context is defined based on flow state of a user using the client system during the established session;

a logic unit for determining an appropriate memory management and object clean up scheme based on the user flow state and object execution scope of the second object; and a logic unit for deallocating the second area of memory, based on the determined scheme, in response to determining that server's memory space has approached a predetermined threshold before the first task terminates.

13. The system of claim 12, further comprising:

a logic unit for uniquely identifying a third object associated with a third task that is a subtask of the second task, wherein a third area of memory is allocated to the third object; and a logic unit for deallocating the third area of memory, in response to determining server's memory space has approached a predetermined threshold before the second task terminates.

14. The method of claim 13, wherein the first, second and third tasks are executed within a session established between a server system and a client system over a communication network.

15. The system of claim 12, wherein the second execution context is terminated, in response to determining that a third task no longer actively services a request.

16. The system of claim 12, wherein the second execution context is terminated, in response to determining that no subtask of the second task actively services a request.

17. The system of claim 11, wherein the first execution context is terminated, in response to determining that a second task no longer actively services a request.

18. The method of claim 11, wherein the first task is executed within a session established between a server system and a client system wherein the first execution context is terminated, in response to determining that the session is terminated.

19. A computer program product comprising a computer useable non-transitory storage medium storing a computer readable program, wherein the computer readable program when executed on a computer causes the computer to:

uniquely identify a first object associated with a first task for an application executed on a server system, responsive to establishment of a session between a client system and the server system over a communication network, wherein the application services requests submitted by the client system to the server system, and wherein a first area of memory in the server system is allocated to the first object;

determine a first execution scope for the first object according to a first execution context associated with the first object, wherein in the first context a first life expectancy is determined for the first object within an execution environment hierarchy defined by an application execution context, a task execution context, and a current execution context, wherein in the application execution context, the first memory area remains allocated to the first object associated with controlling the application executed in the duration of the session, unless the server system's memory space approaches a predetermined threshold wherein in the task execution context, the first memory area remains allocated to the first object associated with the first task while the first task is executed within the context of the first application, unless the server system's memory space approaches a predetermined threshold, and wherein in the current execution context, the first memory area remains allocated to the first object associated with a component of the first task while said component remains active within the context of the first task, unless the server system's memory space approaches a predetermined threshold;

determine a change in execution scope of the first object, in response to monitoring the first execution context, wherein the first execution context is predictively defined based on a flow state of a user using the client system during the established session and the first life expectancy of the first object within the execution environmental hierarchy defined by the application execution context, the task execution context and the current execution context;

determine an appropriate memory management and object clean up scheme based on the user flow state and the determined first life expectancy of the first object; and deallocating the first area of memory, based on the determined scheme, in response to determining that the server's memory space has approached a predetermined threshold before the session within which the first object persists terminates.

20. The computer program product of claim 19, wherein the computer readable program when executed on a computer further causes the computer to:

identify a second object associated with a second task which is a subtask of the first task, wherein a second area of memory is allocated to the second object;

determine a second execution scope for the second object according to a second execution context associated with the second object, wherein the second context defines a second life expectancy for the second object within an execution environment hierarchy relative to the first task;

determine a change in execution scope of the second object, in response to actively monitoring the second execution context, wherein the second execution context is defined based on flow state of a user using the client system during the established session;

determine an appropriate memory management and object clean up scheme based on the user flow state and object execution scope of the second object; and deallocate the second area of memory, based on the determined scheme, in response to determining that server's memory space has approached a predetermined threshold before the first task terminates.

* * * * *